United States Patent [19]

Block

[11] Patent Number: 5,178,316
[45] Date of Patent: Jan. 12, 1993

[54] BRAZED X-RAY TUBE ANODE

[75] Inventor: Wayne F. Block, Sussex, Wis.

[73] Assignee: General Electric Company, Milwaukee, Wis.

[21] Appl. No.: 832,271

[22] Filed: Feb. 7, 1992

[51] Int. Cl.$^5$ .......................... H01J 35/10; B23K 1/19
[52] U.S. Cl. .................... 228/124; 228/239; 228/263.12
[58] Field of Search ........... 228/122, 124, 239, 263.12; 378/144

[56] References Cited

U.S. PATENT DOCUMENTS

| | | | |
|---|---|---|---|
| H547 | 11/1988 | Lux et al. | 228/122 |
| Re. 31,369 | 9/1983 | Devine, Jr. | 228/122 |
| 4,132,917 | 1/1979 | Bildstein et al. | 378/144 |
| 4,145,632 | 3/1979 | Devine, Jr. | 228/122 |
| 4,276,493 | 6/1981 | Srinivasa et al. | 378/144 |
| 4,380,471 | 4/1983 | Lee et al. | 51/307 |
| 4,978,051 | 12/1990 | Tiearney, Jr. et al. | 228/122 |

OTHER PUBLICATIONS

Metals Handbook Ninth Edition, vol. 6, "Brazing of Carbon and Graphite", pp. 1061-1063, copyright 1983.

*Primary Examiner*—Samuel M. Heinrich
*Attorney, Agent, or Firm*—Quarles & Brady

[57] ABSTRACT

A method of bonding a metallic target layer and a graphite disk to provide a composite rotating X-ray tube target wherein a layer of vanadium, titanium, or their alloys is placed between the target layer and the graphite disk. The assembly is heated in a rapid manner through a temperature range as provided by a carbon-braze metal eutectic temperature and a braze metal melt temperature with continued heating to a temperature of 75° C. above the melt temperature. The elevated temperature is maintained for about 5 minutes and then the assembly is cooled in a rapid manner through the temperature range. A composite X-ray tube target is produced having a high remelt temperature and bond strength.

10 Claims, 2 Drawing Sheets

BRAZED X-RAY TUBE ANODE

BACKGROUND OF THE INVENTION

This invention relates to the joining of an X-ray tube target assembly. More particularly, it relates to the joining of the graphite disk to the metallic layer portion wherein vanadium, titanium or their alloys are used as the brazing material with a particular heating and cooling profile.

In producing new and improved targets for rotary anode X-ray application, it is not only necessary for the targets to survive a more rigorous environment in the X-ray tube but they also must be able to survive more rigorous manufacturing processes such as the vacuum firing at temperatures up to 1800° C. This requires that the improved braze provide the following benefits:

1. The braze melt temperature be low enough to not adversely affect the properties of the TZM alloy which can lose significant strength at about 2000° C.
2. After brazing, have a sufficiently high remelt temperature to support the bond through the additional manufacturing steps such as vacuum firing to 1800° C.
3. The bond should be strong and should not be degraded by thermal excursions during normal X-ray tube operation up to 1500° C. for extended periods of time.

For a particular braze metal to work under the above parameters, it must have certain inherent properties. The first would be that it does not have a eutectic or peritectic reaction with the TZM target layer. Ultimately, the braze metal should form only a simple binary couple with the molybdenum in the TZM alloy. This allows an increase in the remelt temperature of the braze by diffusing molybdenum into it and eliminates the possibility of forming a brittle intermetallic layer. This braze metal should also form a stable carbide with the graphite disk or a series of carbides to approximate a gradation in the carbon content of the joint. A basic rule in bonding dissimilar materials is that for a bond to occur there must be some intermixing of the elements between the two materials. Also, for this bond to have significant strength, the gradation of intermixing should approximate that of a binary diffusion couple where the two materials diffuse together in equal portions.

It has been found that vanadium and titanium form simple isomorphic structures with molybdenum at freezing and both form thermodynamically stable carbides with graphite.

Both vanadium and titanium form carbides with graphite by the eutectic reaction. This is both a benefit to the braze process and an obstacle. First, it is a benefit in that it allows carbon to extend into the braze joint, giving a more gradual gradation of carbon at the interface. It is an obstacle in that the V,Ti-C eutectic reaction temperature is lower than the melt temperature of these metals. To limit the extent of carbon alloying in the braze metal, it is necessary to heat as quickly as possible through the eutectic temperature to the braze metal melt temperature. This allows the braze metal to melt and mix with the TZM alloy while at the same time limiting the eutectic reaction and subsequent alloying between the graphite and the braze metal. A further explanation of a resulting braze joint is given in the diagrams shown in FIGS. 1A–C where the dashed line on the left represents the carbon concentration at the braze interface with the source being the graphite and the dashed line on the right represents the molybdenum concentration at the braze interface with the source being the TZM.

FIG. 1A shows a braze joint that has equal mixing with each of the materials to be bonded. In this case, the braze metal not only acts as a bonding agent but also as a barrier to separate the two materials. The melt temperature for this type bond would be just above the braze metal melt temperature. FIG. 1B shows a braze joint that had extensive mixing with carbon but limited mixing with molybdenum. The melt temperature for this joint would be above the eutectic melt temperature with carbon but less than the melt temperature of the braze metal. FIG. 1C shows the braze joint for this invention. It is seen that there is some mixing between carbon and the braze metal but that there is extensive mixing between molybdenum and the braze metal. With this particular type of intermixing of the subject materials, one can achieve all of the stated objectives of the improved braze joint. The brazing temperature is less than 2000° C. for the braze metals, remelt temperature is enhanced by the extensive alloying of molybdenum in the braze joint, and the bond is thermally stable up to 1800° C.

U.S. Pat. No. 4,715,055 describes a technique for using platinum as a braze metal. Experiments have shown that this braze joint is thermally unstable and that temperatures above 1500° C. can quickly degrade the bond strength. Another patent, U.S. Pat. No. 3,710,170, describes another technique whereby a molybdenum-carbon eutectic is formed by heating the assembly to 2200° C. This would degrade the physical strength of the TZM alloy. Also, it has been seen that the $Mo_2C$ carbide tends to form many cracks which can impair heat flow and joint strength. British Patent 1,383,557, describes a process whereby a braze metal of zirconium or titanium or their alloy is used. This patent states that the assembly should be heated to a temperature just above the target metal substrate-braze metal eutectic temperature but below the melt temperature of the braze metal. It has been determined that there is no eutectic reaction between titanium and molybdenum (or tungsten, or tantalum, or rhenium). Therefore, to use titanium and heat the assembly to a temperature below the melt temperature of titanium means that this bond was formed by the eutectic reaction between titanium and carbon. The remelt temperature would be approximately 1650° C., well below the stated goal of 1800° C. As for zirconium, it does have a eutectic reaction with the target layer, specifically molybdenum. The eutectic reaction temperature is approximately 1575° C. Again, this is well below the stated remelt temperature of 1800° C. Also, a brittle intermetallic layer is formed at the target layer-braze joint interface which also degrades the bond strength.

It is, therefore, an object of the present invention to provide an improved composite X-ray target with a brazed interconnection having improved bond strength and with selected temperature characteristics. Another object of the present invention is to provide an improved method of brazing composite X-ray tube targets with a particular heating and cooling profile which utilizes vanadium or titanium as the brazing material.

These objects and other features and advantages will become more readily apparent upon reference to the following description when taken in conjunction with the appended drawings.

SUMMARY OF THE INVENTION

Briefly, in accordance with one aspect of the present invention there is provided a method of bonding a metallic target layer and a graphite disk to result in a composite rotating X-ray tube target. There is placed a layer of vanadium, titanium, or their alloys between the metallic target layer and the graphite disk to provide an assembly. The assembly is heated in a rapid manner through a temperature range as defined by a carbon-braze metal eutectic temperature and a braze metal melt temperature. Heating is continued on the assembly to an elevated temperature in the range of 50°-100° C. above a melt temperature of the vanadium, titanium, or their alloys. This temperature is maintained until a complete melting of the braze metal and an intermixing with the molybdenum is effected. Thereafter, the heated assembly is cooled through the temperature range in a rapid manner.

According to various aspects of the invention, the vanadium or titanium is in the form of a sheet and the sheet is about 9-12 mils. in thickness. The elevated temperature is maintained for about 3 to 5 minutes. The heating of the assembly in a rapid manner is effected at a rate of about 20° C./min. and the cooling of the heated assembly in the rapid manner is effected at a rate of about 50° C./min. There is produced by the foregoing method, an improved composite X-ray tube target with a high remelt temperature and bond strength.

In the drawings as hereinafter described, preferred embodiments are depicted. However, various other modifications and alternative constructions can be made thereto without departing from the true spirit and scope of the invention.

DESCRIPTION OF THE PREFERRED EMBODIMENT

Figure 1A:
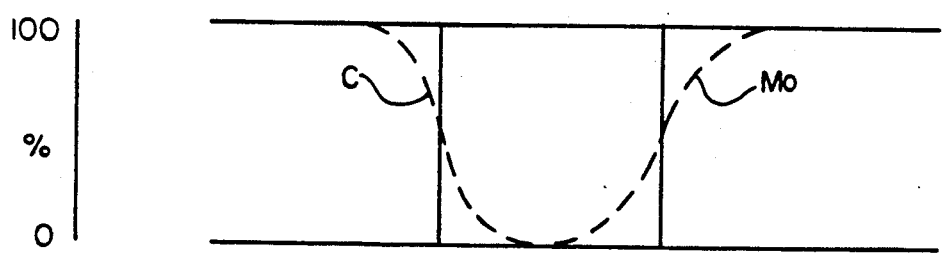
FIGS. 1A-C are diagrams showing various compositions of different brazed joints.
Figure 1B:
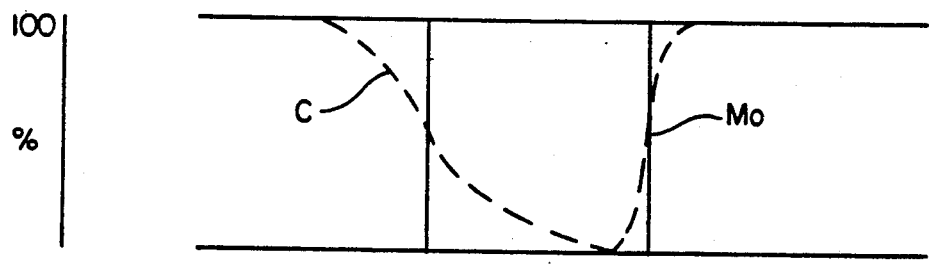
Figure 1C:
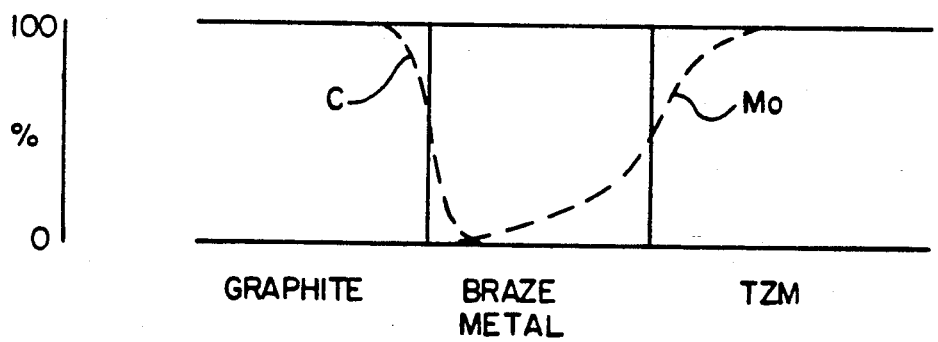
Figure 2:
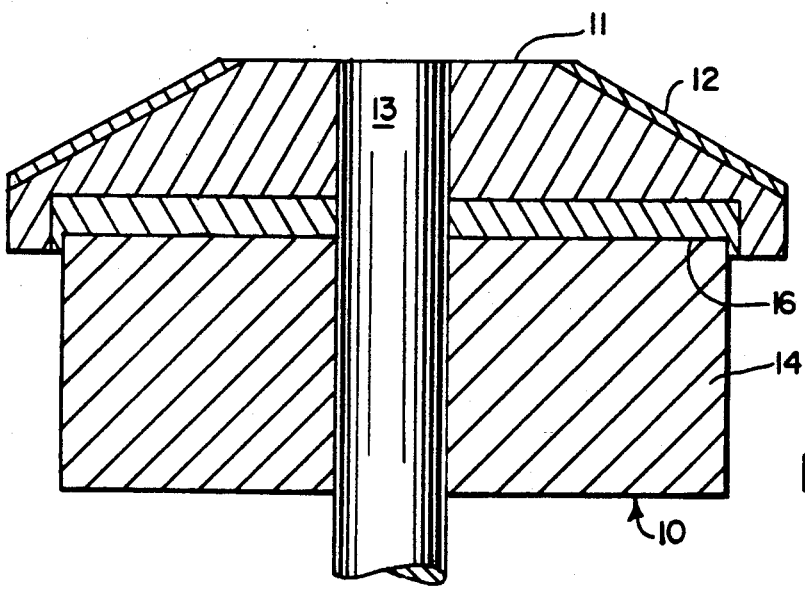
FIG. 2 is a sectional view of an X-ray target made in accordance with the invention.

Referring now to FIG. 2, there is shown a target, or anode assembly generally 10, for use as a rotating anode X-ray tube in accordance with the invention. The assembly 10 includes a metal disc portion 11 having a focal tract 12 applied to a forward face thereof for producing X-rays when bombarded by the electrons from a cathode in a conventional manner. The disc 11 is composed of a suitable refractory metal such as molybdenum or molybdenum alloy such as TZM. The conventional focal track 12 disposed thereon is composed of a tungsten or a tungsten/rheniun alloy material. The disc 11 is attached to a stem 13 by a conventional method, such as by brazing, diffusion bonding, or mechanical attachment.

Attached to a rear face of the metal disc 11 is a graphite disc portion 14, the attachment being made by titanium braze, indicated at 16, in a manner to be described hereafter. The primary purpose of the graphite disc 14 is to provide a heat sink for the heat which is transferred through the metal disc 11 from the focal track 12. It is best if the heat-sink function can be provided without contributing significantly to the mass of the target assembly.

Figure 3:
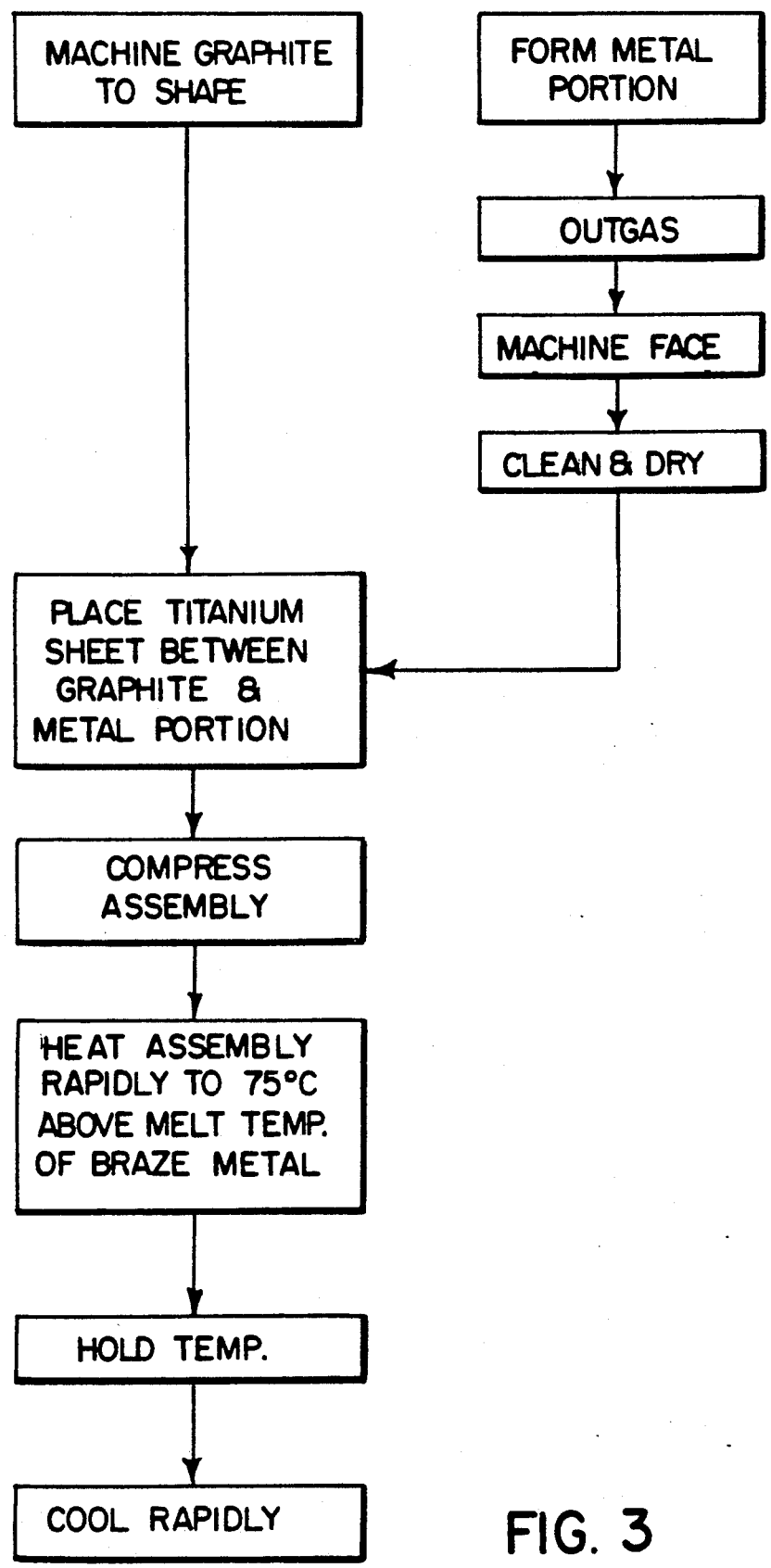
FIG. 3 is a flow diagram showing the process of target fabrication in accordance with the preferred embodiment of the invention.

The specific process to achieve this improved braze joint is described in the flow diagram FIG. 3 with all of the steps prior to the placement of the titanium sheet between the graphite and metal portions being standard. As indicated in the diagram, a sheet of titanium is placed between the TZM target layer 11 and the graphite disc 14. The sheet has a thickness of approximately 9 mils.

The assembly is compressed and placed in a vacuum chamber furnace which is pulled to a vacuum of about $10^{-5}$ torr. The assembly is heated to 1550° C. and held for 30 minutes. Heat is rapidly applied at the rate of about 20° C./min. through the critical temperature region which is the temperature zone between the carbon-braze metal eutectic temperature and the braze metal melt temperature.

Heating of the assembly is continued until a temperature of 1750° C. is reached which is approximately 75° C. above the melt temperature of the braze metal. This temperature is held for approximately 5 minutes. After this holding period, the assembly is cooled rapidly at the rate of about 50° C./min. back through the critical carbon eutectic temperature-braze metal melt temperature region.

Process testing of the anode assembly 10 was conducted wherein the assembly was fabricated using the previously indicated furnace conditions. This consisted in the brazed target being ultrasonically scanned for discontinuities wherein none were found. The target was rough machined to final dimensions and then heated in a vacuum furnace to a series of temperatures and soaked. After each thermal run, the braze joint was ultrasonically scanned. Results are given in the following table along with the results of a platinum brazed and zirconium brazed joint.

| Thermal Cycle | C-Scan Results | | |
| --- | --- | --- | --- |
| | Ti Brazed | Pt Brazed | Zr Brazed |
| 1350° C./10 hrs | No Debond | 25% Debond | No Debond |
| 1400° C./10 hrs | No Debond | 100% Debond | No Debond |
| 1450° C./10 hrs | No Debond | — | No Debond |
| 1500° C./10 hrs | No Debond | — | No Debond |
| 1600° C./10 hrs | No Debond | — | 100% Debond |
| 1800° C./1 hr | No Debond | — | — |

After the 1800° C. fire, the titanium brazed target was Global Stress Tested. The target withstood a load of 10,000 lbs before failing. The fracture path was through the graphite about a tenth of an inch above the braze joint. This strength is equivalent to that of an as-brazed and machined platinum brazed target.

While this invention has been described with reference to a particular preferred embodiment, other modifications and variations will appear to those skilled in the art in view of the above teachings. For example, while a holding temperature of 5 minutes is stated for the 1750° C. heat in the furnace, this can vary from 3 to 5 minutes. Further, the holding temperature can range from 50°-100° C. Neither is it necessary that the respective heating and cooling rates of 20° C./min. and 50° C./min. be precisely followed. This can vary from 20° C./min. to 30° C./min. for the heating rate and 50° C./min. to 70° C./min. for the cooling rate. Vanadium and titanium are the preferred metals for use in the process of this invention. However, alloys of these metals are also operable such as vanadium alloyed with titanium, titanium alloyed with vanadium and vanadium and titanium alloyed with columbium, hafnium, platinum or zirconium. Accordingly, it should be understood that within the scope of the appended claims the invention may be practiced otherwise than is specifically described.

I claim:

1. A method of bonding a metallic target layer containing molybdenum and a graphite disk to provide a composite rotating X-ray tube target comprising:

placing a braze metal layer of vanadium or titanium or alloys thereof between said metallic target layer and said graphite disk to provide an assembly;

heating said assembly in a rapid manner through a temperature range as defined by a carbon-braze metal eutectic temperature and a braze metal temperature;

continue heating said assembly to an elevated temperature in the range of 50°-100° C. above a melt temperature of said braze metal;

maintaining said elevated temperature until a complete melting of said braze metal and an intermixing with the molybdenum is effected; and cooling said heated assembly through said temperature range in a rapid manner.

2. The method of claim 1 wherein said layer of braze metal is in the form of a sheet.

3. The method of claim 1 wherein said sheet is about 9-12 mils. in thickness.

4. The method of claim 1 wherein said elevated temperature is maintained for about 3 to 5 minutes.

5. The method of claim 1 wherein a layer of vanadium is placed between said metallic target layer and said graphite disk.

6. The method of claim 1 wherein a layer of titanium is placed between said metallic target layer and said graphite disk.

7. The method of claim 1 wherein a layer of vanadium or titanium alloys is placed between said metallic target layer and said graphite disk.

8. The method of claim 1 wherein said heating of said assembly in a rapid manner is effected at a rate of about 20° C./min.

9. The method of claim 1 wherein said cooling of said heated assembly in said rapid manner is effected at a rate of about 50° C./min.

10. The method of claim 1 wherein said elevated temperature for said continued heating is 75° C. above said melt temperature of said braze temperature.

* * * * *